United States Patent

Massholder

[11] Patent Number: 5,891,329
[45] Date of Patent: Apr. 6, 1999

[54] WATER TAPPING FIXTURE

[76] Inventor: Karl F. Massholder, Panoramastrasse 27, 69250 Schönau b. Heidelberg, Germany

[21] Appl. No.: 852,217

[22] Filed: May 7, 1997

[30] Foreign Application Priority Data

May 10, 1996 [DE] Germany .................. 196 18 771.0

[51] Int. Cl.$^6$ .................................................. C02F 1/32
[52] U.S. Cl. .................. 210/100; 4/597; 4/615; 4/222; 210/209; 210/282; 210/460; 250/430; 250/436
[58] Field of Search .................. 4/597, 602, 603, 4/615, 616, 222, 903; 210/748, 192, 198.1, 199, 205, 509, 282, 460, 100, 232; 250/430, 435, 436

[56] References Cited

U.S. PATENT DOCUMENTS

| | | |
|---|---|---|
| 2,189,279 | 2/1940 | Bitner . |
| 4,069,153 | 1/1978 | Gunther .................................. 210/192 |
| 4,752,401 | 6/1988 | Bodenstein .............................. 210/746 |
| 4,933,080 | 6/1990 | Rundzaitis et al. ..................... 210/232 |
| 5,070,553 | 12/1991 | Chambers .................................. 4/615 |
| 5,293,654 | 3/1994 | Castwall et al. ........................... 4/598 |
| 5,385,667 | 1/1995 | Steger .................................. 210/198.1 |
| 5,529,689 | 6/1996 | Korin ...................................... 210/232 |
| 5,540,848 | 7/1996 | Engelhard ............................. 210/748 |
| 5,545,314 | 8/1996 | Parise et al. ............................ 210/100 |

*Primary Examiner*—Peter A. Hruskoci
*Attorney, Agent, or Firm*—Friedrich Kueffner

[57] ABSTRACT

A water tapping fixture with an outlet opening which is connected to a supply connection through a pipe having at least one valve, wherein an ultraviolet light radiating device is arranged in the pipe connected to the water tapping fixture. The ultraviolet light radiating device is arranged closely adjacent the outlet opening of the fixture. The outlet opening may be arranged in a head which is movable relative to a base part and the ultraviolet light radiating device is arranged in the head. Such a head may be, for example, a shower head which is connected through a hose to a wall fixture. The head may be connected through a flexible line to the base part and a feed line for the ultraviolet light radiating device is attached to the flexible line.

17 Claims, 1 Drawing Sheet

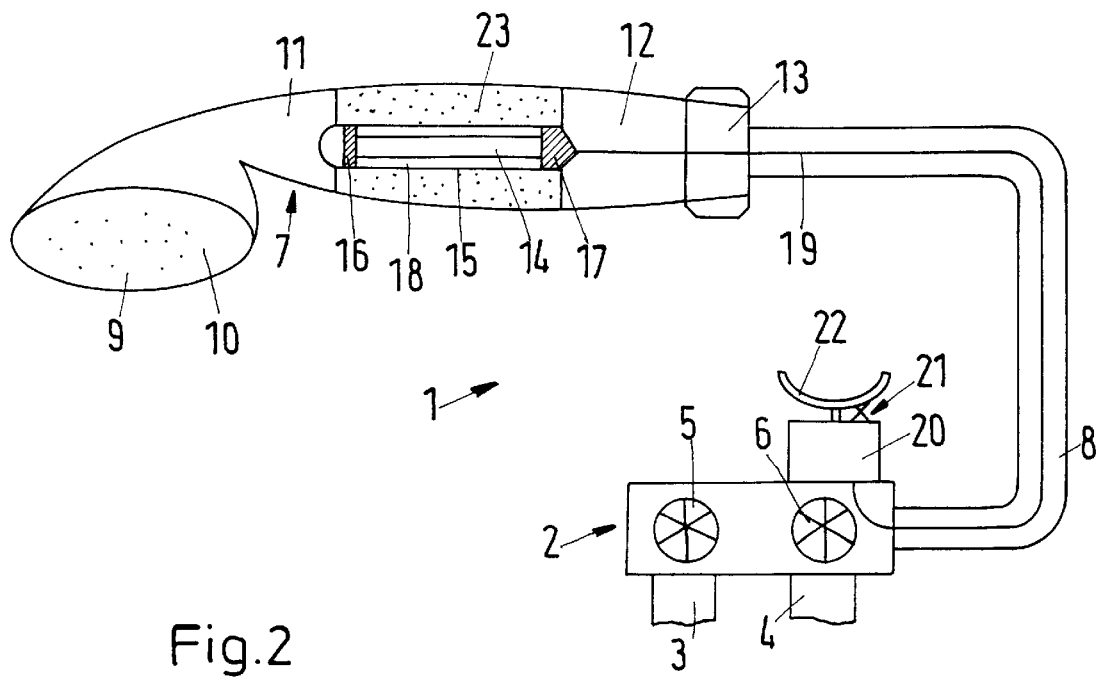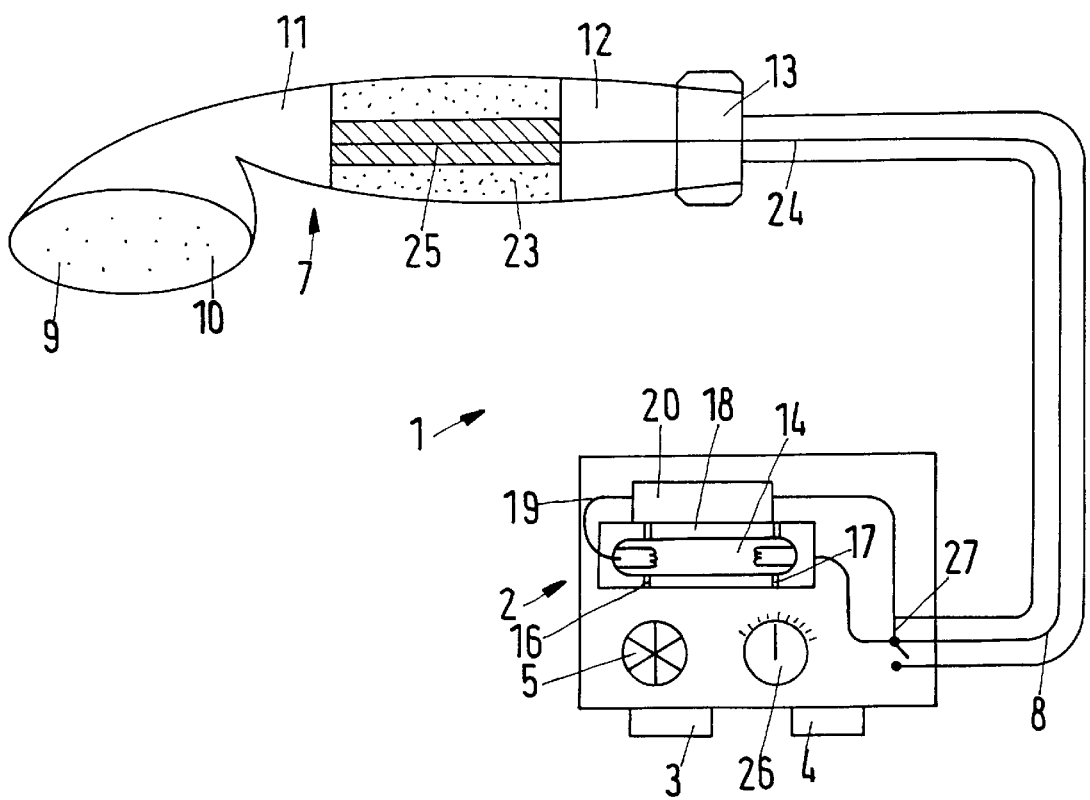

WATER TAPPING FIXTURE

BACKGROUND OF THE INVENTION

1. Field of the Invention

The present invention relates to a water tapping fixture with an outlet opening which is connected to a supply connection through a pipe having at least one valve.

2. Description of the Related Art

Water tapping fixtures of the above-mentioned type are used for removing water from a supply system in a house or building, for example, a system of water pipes. They are usually arranged above a sink in a bathroom or kitchen, a bathtub or a shower. The water removed from the fixtures is used for cleaning or refreshing the human body and is used as drinking water.

In all of the aforementioned cases, water removed through such a water tapping fixture comes into contact with the human body or is consumed by the human body, either by swallowing during drinking or by breathing, for example, when the user takes a shower and breathes the vapors, mists or water droplets produced thereby.

Clean drinking water is an essential requirement for the health of the human body. Therefore, in most developed countries, drinking water is made available by public supply systems having a high quality, particularly with respect to cleanliness and low counts of germs. Accordingly, it can be assumed that the water delivered to households, hotels, restaurants or businesses meets the standards required by law which, for example, require that water may not contain more than a given number of germs. This requirement is practically continuously met because the water of public supply systems is continuously circulated.

On the other hand, the conditions in the network of pipes in some houses may be quite different. Houses have tapping points which are used infrequently and, therefore, the flow through these points is not optimal. These problems occur especially in weekend and vacation homes, hotels, etc., in which the water removal takes place in longer intervals. This is because in most water tapping fixtures there are dead spaces in which the water remains after a removal. These dead spaces are flushed only during the next water removal. As long as no water removal takes place, germs, i.e., microorganisms and the like, can multiply. The germ contents in these dead spaces frequently reach a value which is actually no longer permissible with respect to health aspects. Consequently, substantially contaminated water is removed from the water tapping fixture at the beginning of the removal process. Since the germs frequently also deposit at the walls of the water fixture, particularly in the aforementioned dead spaces, the subsequently flowing water also has higher germ contents than the water originating directly from the public supply system. The removed water is also not usually heated over a minimum period of time to about 60°–70° C. This means that the germs are also not killed off.

The addition of chlorine and other chemicals also only has a limited effect in this situation.

Therefore, it can be sometimes observed that filter elements with fine pores are connected to the water tapping fixtures, for example, water faucets. These filter elements are capable of holding back germs to a predetermined size. However, such filters are frequently not capable of holding back smaller germs, for example, viruses. Moreover, the germs actually collect in the filter and, thus, produce the danger of infection, particularly when such filters are removed. Furthermore, it has been found that when such filters are used for a longer period of time, the germs may grow through the pores which are smaller than their own diameter. This means that the germs finally do reach the "germ-free side" of the filter and can be discharged through the water fixture.

SUMMARY OF THE INVENTION

Therefore, it is the object of the present invention to improve the hygienic conditions in water tapping fixtures which are used infrequently.

In accordance with the present invention, the above-described object is met by arranging an ultraviolet light radiating device in the pipe connected to the water tapping fixture.

Accordingly, the ultraviolet light radiating device discharges ultraviolet radiation, i.e., light in the ultraviolet spectrum, directly into the pipe and the ultraviolet light can act on the germs and microorganisms which are present in the pipe. Consequently, an effective degermination takes place directly in the pipe, so that a previously produced contamination of the water with germs can be at least partially reversed. When speaking of degermination, this does not mean that the water is rendered entirely free of germs. This is because the ultraviolet rays do not cause the germs and other microorganisms to be killed in all cases. They may also have the effect that the DNA of microorganisms is changed or damaged, so that these microorganisms can no longer reproduce or can no longer reproduce to the same extent. Also, statistically some microorganisms always "survive" the radiation. However, this is not critical. It is important that the germ content of the water in the water tapping fixture itself is reduced, also especially at those locations at which the water does not flow over longer periods of time. Accordingly, the microorganisms or germs are combated directly "on location", i.e., in the water tapping fixture itself, so that it is ensured that the water discharged through the water tapping fixture has flowed through an area in which it was subjected to the ultraviolet radiation. This means that a significant reduction of the germ count in the water is achieved.

In accordance with a preferred feature, the ultraviolet light radiating device is arranged closely adjacent the outlet opening of the fixture. This means that the water volume present between the ultraviolet light radiating device and the supply connection is as large as possible and the later volume which may still be present between the ultraviolet light radiating device and the outlet opening is as small as possible. This ensures that the most of the water removed through the water tapping fixture has flowed past the ultraviolet light radiating device to be decontaminated.

The outlet opening is preferably arranged in a head which is movable relative to a base part and the ultraviolet light radiating device is arranged in the head. Such a head may be, for example, a shower head which is connected through a hose to a wall fixture. Water usually remains in the hose after water removal. Germs could multiply undisturbed if water does not flow through the hose on a regular basis. Accordingly, when the ultraviolet light radiating device is arranged in the head, i.e., the shower head, the water previously stored in the hose is always conducted past the ultraviolet light radiating device and is decontaminated as a result.

In accordance with a particularly preferred feature, the head is connected through a flexible line to the base part and a feed line for the ultraviolet light radiating device is attached to the flexible line. This ensures that the ultraviolet light radiating device is supplied even if the head is moved relative to the base part. On the other hand, the ease of use is not reduced because the user must still only manipulate one hose which now comprises the water supply and the feed line for the head.

It is advantageous if the feed line is arranged within the flexible line. It is then possible to observe from outside that additional measures for degerminating the water are in place. Accordingly, the user does not have to change his or her usual habits.

The ultraviolet light radiating device preferably has a principal ray emission with a wavelength in the range of 250–255 nm. Such a ray emission is produced, for example, when using low pressure mercury vapor radiators which have an emission spectrum mainly with a wavelength of 253.7 nm. The absorption spectrum of many microorganisms or the DNA thereof is in the same range, so that the use of this principal ray emission results in a rather good decontamination or reduction of multiplication of the microorganisms with a high degree of efficiency.

In accordance with a preferred embodiment, the ultraviolet light radiating device is constructed as an ultraviolet radiator arranged directly in the pipe. In this case, the ultraviolet light is produced directly in the pipe and is discharged in the pipe. This means that there are practically no transportation losses of the ultraviolet light. It is only necessary to supply electrical energy.

In accordance with an alternative embodiment, the ultraviolet light radiating device is constructed as a discharge arrangement of an ultraviolet light-permeable light conductor which conducts the ultraviolet rays from an ultraviolet radiator into the pipe. In this case, the ultraviolet radiator can be arranged outside of the desired location of application and the ultraviolet light can be conducted to the desired location of use by means of the aforementioned light conductor. This embodiment is advantageous because the protective measures are less complicated in this case as compared to arranging the usually electrically operated ultraviolet radiator directly in the pipe. Accordingly, the type of application determines which embodiment is to be used.

The ultraviolet light radiating device preferably extends longitudinally in the direction of the extension of the pipe and discharges the ultraviolet rays essentially radially relative to the extension of the pipe. By extending longitudinally, it is ensured that the ultraviolet light radiating device subjects the water flowing past it to ultraviolet rays over a longer period of time. This improves the degermination. The effect on the germs is also dependent on the duration of radiation. The intensity of radiation and the duration of treatment and/or decontamination results in the so-called dose. The higher the dose, the more effective the degermination or other treatment of the germs, In accordance with another advantageous feature, the ultraviolet light radiating device is provided with a switch for activating the device. This switch switches the ultraviolet light radiating device on, particularly when the water is to be removed through the fixture. The switch may be actuated manually. However, the switch may also be actuated by a manipulation of the fixture, for example, when a shower head is removed from the wall fixture or when a water valve is opened. The movement required for lifting or opening can be utilized for producing an appropriate control signal for activating the ultraviolet light radiating device.

The switch preferably is constructed as a flow switch. Accordingly, the switch is automatically activated when water flows through the fixture. In this case, it is ensured that the ultraviolet light radiating device is activated and subjects the water to ultraviolet light as soon as water begins to flow.

In accordance with another advantageous feature, a filter having a predetermined maximum pore size is arranged in the area of the ultraviolet light radiating device. Various pathogenic germs require a higher ultraviolet radiation dose for inactivation. This concerns particularly bacterial cell agglomerations and protozoa (for example, amoeba, cryptosporida). In addition, for example, the legionella germ settles within larger amoeba and, thus, requires a higher dose for inactivation because it is protected by the cell wall of the host. Accordingly, in the case of a simple ultraviolet light radiation, the germ frequently escapes inactivation. This is now counteracted by the filter. On the one hand, the filter allows water to flow therethrough possibly with a slight reduction of the flow velocity. However, the aforementioned larger germs remain in the filter and, because the filter is arranged in the area of the ultraviolet light radiating device, the larger germs are then subjected to the ultraviolet light as long as they remain in the filter. This may be a rather long period of time, Consequently, the chance of actually inactivating the germs increases.

The filter preferably is constructed as a matrix of an ultraviolet light-permeable material, particularly quartz material. The matrix material, particularly the quartz material, is permeable to ultraviolet radiation of around 254 nm and, thus, has a similar effect as a light conductor. Consequently, it has a double function. On the one hand, it holds back the germs which are subjected to an extended radiation time as a result, On the other hand, the ultraviolet light is also conducted to more remote locations so that there is no danger of a shading effect.

This advantageous result is particularly increased if the material has a plurality of contact points within the matrix and if the material of the matrix has a plurality of contact points with the ultraviolet light radiating device. This results in a direct light conduction from one "grain" to the next "grain", i.e., to the contact points of the individual "grains", i.e., the bodies of which the matrix is composed. On the other hand, a light dispersion occurs at each "fracture edge"; this light dispersion stochastically causes a portion of the ultraviolet light to be discharged to the surroundings. Consequently, larger germs are held back and simultaneously subjected to a higher radiation dose from all sides, so that a shading effect is not possible.

The ultraviolet light radiating device preferably includes an electrical preswitching arrangement which produces a feed voltage having a frequency of more than 10 kHz, particularly 30 kHz or more. This makes it possible, on the one hand, to increase the yield of ultraviolet radiation with the same energy use, while, on the other hand, the service life of the ultraviolet light radiating device is increased. This is believed to be due to the fact that, in the case of such high frequencies, the plasma necessary for producing ultraviolet radiation through gas discharge is maintained, i.e., does not have to be built anew for each electrical variation.

The ultraviolet light radiating device is preferably subjected at all components which are accessible from outside to an electrical voltage of at most 42 V. The is a so-called protective low voltage. The components accessible from outside are not exposed, but usually are insulated; however, they are not covered by a housing or other protective measures. There is no danger to the user even if the insulation is damaged and the voltage-conducting components are touched. When water comes into contact with such voltage-conducting components, the device may be damaged, but does not endanger the user.

The outlet opening is preferably arranged at an angle relative to the pipe. This prevents the user to be subjected to the ultraviolet light. The ultraviolet light, which like any other light can only propagate along a straight line, remains within the pipe and exclusively serves to degerminate the water flowing past it.

The ultraviolet light radiating device is advantageously constructed as a water-tight encapsulated unit which is filled with an oxygen-free gas, particularly nitrogen. The ultraviolet radiators must be protected against a direct contact with water. This is achieved by constructing the device as a water-tight encapsulated unit. However, there do remain hollow spaces in this unit. In order to prevent the formation of ozone due to short-wave ultraviolet light in the housing, and to prevent premature aging of the radiators due to penetrating moisture and/or dust, the hollow spaces are filled with an oxygen-free gas; nitrogen has been found useful for this purpose because it is easily available and inexpensive.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a schematic illustration, partially in section, of a first embodiment of a water tapping fixture mounted in a shower head; and FIG. 2 is an illustration of a second embodiment of the water tapping fixture according to the present invention.

DESCRIPTION OF THE PREFERRED EMBODIMENTS

FIG. 1 of the drawing shows a water tapping fixture 1. In the illustrated embodiment, the water tapping fixture 1 includes a base part or wall fixture 2 which is connected to a cold water pipe 3 and a hot water pipe 4 and is rigidly mounted on a wall. The cold water pipe 3 and the hot water pipe 4 form a supply connection. The supply connection, in turn, forms part of a water system of a house or building and is connected through this system to a connection point of a house or building, possibly through a heating unit. The connection point of the house is in connection with a public supply network. It is also conceivable that the connection point is connected to a water reservoir.

The wall fixture 2 simultaneously forms a mixing unit in which the water supplied through the cold and hot water connections 3, 4 is mixed in order to achieve a temperature desired by the user. The adjustment is carried out through faucets 5, 6 which each operate a valve, not shown in detail.

The fixture 1 of FIG. 1 further includes a shower head 7 which is connected though a flexible line 8 to the wall fixture 2. The shower head 7 includes an outlet opening 9 which is covered by a screen 10. The shower head 7 further includes a grip portion 11, wherein a section 12 of the line is arranged in the interior of the grip portion 11. The section 12 is connected through the line 8 to the wall fixture 2. The outlet opening 9 is arranged at an angle relative to the line section 12; in the illustrated embodiment, the angle is about 90°.

The line 8 is connected to the shower head 7 through a cap nut 13.

An ultraviolet radiator 14 is arranged in the grip portion 11 of the shower head 7. The ultraviolet radiator 14 is surrounded by a quartz immersion pipe 15. Spacers 16, 17 ensure that an annular space 18 remains between the quartz immersion pipe 15 and the ultraviolet radiator 14. This annular space 18 is filled with nitrogen or with another oxygen-free gas, preferably an inert gas. The immersion pipe 15 forms a water-tight encapsulated housing, wherein only the electrical line 19 extends through the housing. Of course, the electrical connections are of water-tight construction. Instead of a quartz immersion pipe 15 it is also possible to use an immersion pipe of another material which is ultraviolet light-permeable.

The electrical line 19 extends through the flexible line 8 to the wall fixture 2. The wall fixture 2 includes an electrical preswitching device 20 which is provided with an activating switch 21. When the shower head 7 is lifted from a position of rest from a fork 22, the preswitching device 20 is activated and then supplies the ultraviolet light radiator 14 through the electrical line 19 with an electrical voltage, so that the ultraviolet radiator starts to emit ultraviolet light.

The electrical preswitching device produces an electric voltage having a frequency of more than 10 kHz, particularly 30 kHz or more. When using such frequencies, it is assumed that the plasma which builds up during the gas discharge between the oppositely located electrodes of the ultraviolet radiator 14, does not completely collapse again before the next gas discharge takes place during the next electric variation. In this manner, it is possible to achieve an energy-saving operation and, in addition, to increase the service life of the ultraviolet radiator 14. The voltages which are transmitted through the line 19 remain below 42 V, i.e., the range of a protective low voltage. It is sufficient if the voltages are in the range of 12 V.

The ultraviolet radiator 14 is preferably constructed as a low pressure mercury vapor radiator, i.e., it has a principal ray emission with a wavelength in the range of 250–255 nm. More precisely, the principal spectrum line is at 253.7 nm. This wavelength comes very close to the principal absorption line of the DNA of microorganisms, so that a very high degree of efficiency is achieved.

The ultraviolet radiator 14 has a certain elongation aligned in the longitudinal direction of the line section 12. Accordingly, the water which flows past the radiator 14 is subjected to the ultraviolet radiation for a period of time so that a relatively high radiation dose can act on the water which flows past.

This effect is further increased by providing a filter 23 surrounding the ultraviolet radiator 14 which, together with the surrounding quartz immersion pipe 15, forms an ultraviolet radiation discharge device. The filter 23 is constructed as a matrix of a quartz material or another ultraviolet light-permeable material. For example, it is possible to use quartz fractions having a defined particle size or sintered or foamed quartz (foamed glass) with defined pore/particle diameters.

On the one hand, the filter 23 slightly reduces the velocity of the water flowing through. On the other hand, the filter 23 holds back larger germs, for example, bacterial cell agglomerations and protozoa, for example, amoeba or cyrptosporida. These larger germs cannot easily pass through the filter 23. If they can pass through at all, they require a long period of time to do so. However, during this time, they are subjected to the radiation of the ultraviolet light. The matrix of the filter 23 is constructed in such a way that particles of the filter 23 are located tightly against each other and form a plurality of contact points with each other. On the other hand, they also form a plurality of contact points with the quartz immersion pipe 15. Consequently, a direct light line can take place from the quartz radiator 14 into the interior of the filter 23. In the interior of the filter 23, the ultraviolet light is conducted from particle to particle and, as a result, can reach even more remote areas in the interior of the shower head 7. However, at each "fracture point" or surface of the particles, a portion of the ultraviolet light escapes, wherein this escaping ultraviolet light can act on germs which are at this location. This also overcomes the problem that the penetration depth of ultraviolet light is substantially reduced when the water is somewhat dirty. Because of the filter 23, the ultraviolet light practically has no longer distances available through which the water must travel. Rather, the water sections have only such a length which is permitted by the filter 23.

Due to the fact that the outlet opening 9 is arranged at an angle relative to the grip portion 11, there is no danger that the ultraviolet light emerges through the outlet opening 9 and endangers a user. On the other hand, the ultraviolet light results in a relatively satisfactory and reliable decontamination of germs of the water flowing out through the fixture.

FIG. 2 of the drawing shows a different embodiment in which the same elements are provided with the same reference numerals.

In contrast to the embodiment of FIG. 1, the wall fixture 2 of FIG. 2 only has one water faucet 5 for controlling the quantity. The temperature adjustment is carried out through a thermostat valve 26.

Furthermore, the ultraviolet radiator 14 is no longer arranged in the shower head itself, but in the wall fixture 2. The ultraviolet radiator 14 is also in this embodiment supported in a housing through spacers 16, 17 and is supplied with electric voltage from a preswitching device 20 through an electric line 19.

In this embodiment, the ultraviolet light is conducted through a light conductor 14 to the shower head 7, wherein the light conductor 24 is also arranged within the flexible line 8, i.e., the water hose. A discharge arrangement 25 is provided at the end of the light conductor 24, wherein the discharge arrangement 25 distributes the emerging light essentially radially. Also in this case, a filter 23 is arranged in such a way that it surrounds the discharge arrangement 25.

The use of an ultraviolet radiator or a light conductor with ultraviolet discharge arrangement is not limited to a shower head. Rather, the same solution can also be used for normal water faucets in which there is the danger that water remains between the valve and the outlet opening 9 as can be expected in the case of a shower head in the hose, i.e., the flexible line 8 In the embodiment of FIG. 2, the preswitching device 20 and, thus, the ultraviolet radiator are always activated when water flows into the flexible line 8. For this purpose, a flow switch 27 is provided at the beginning of the flexible line.

All voltages are kept below a value of 42 V. In most cases, a supply voltage of 12 V is sufficient. This has the advantage that, even when insulations within the electrical arrangements are damaged, the user is not endangered.

While specific embodiments of the invention have been shown and described in detail to illustrate the inventive principles, it will be understood that the invention may be embodied otherwise without departing from such principles.

I claim:

1. A water tapping fixture comprising a line section connected to a supply connection, the line section having at least one valve and an outlet opening, further comprising an ultraviolet light radiating device arranged in the line section, a base part and a head movable relative to the base part, the outlet opening being arranged in the movable head, wherein the ultraviolet light radiating device is arranged in the head, and a filter at the ultraviolet light radiating device, the filter having a predetermined maximum pore size for filtering water passing through said head, wherein the filter is a matrix of an ultraviolet light-permeable material arranged to be subjected to ultraviolet light from said radiating device, and wherein the ultraviolet light-permeable material is quartz material.

2. The fixture according to claim 1, wherein the ultraviolet light radiating device is arranged adjacent the outlet opening.

3. The fixture according to claim 1, comprising a flexible line connecting the head to the base part and a feed line for the ultraviolet light radiating device, wherein the flexible line and the feed line extend together.

4. The fixture according to claim 3, wherein the feed line is arranged within the flexible line.

5. The fixture according to claim 1, wherein the ultraviolet light radiating device has a principal ray emission having a wavelength in the range of 250–255 nm.

6. The fixture according to claim 5, wherein the ultraviolet light radiating device comprises a discharge arrangement of an ultraviolet light-permeable light conductor for conducting ultraviolet rays from the ultraviolet radiator in the line section.

7. The fixture according to claim 1, wherein the ultraviolet light radiating device is an ultraviolet radiator arranged immediately in the line section.

8. The fixture according to claim 1, wherein the ultraviolet light radiating device extends longitudinally in the longitudinal direction of the line section, wherein the ultraviolet light radiating device is configured to discharge ultraviolet rays essentially radially relative to the line section.

9. The fixture according to claim 1, further comprising a switch for activating the ultraviolet light radiating device.

10. The fixture according to claim 9, wherein the switch is a flow switch.

11. The fixture according to claim 1, wherein the ultraviolet light-permeable material has a multitude of contact points within the matrix and a multitude of contact points with the ultraviolet light radiating device.

12. The fixture according to claim 1, wherein the ultraviolet light radiating device comprises an electrical preswitching arrangement for producing a feed voltage having a frequency of more than 10 kHz.

13. The fixture according to claim 12, wherein the feed voltage has a frequency of 30 kHz or more.

14. The fixture according to claim 1, wherein the ultraviolet light radiating device is configured to be subjected at all externally accessible parts thereof to an electrical voltage of at most 42 V.

15. The fixture according to claim 1, wherein the outlet opening is arranged at an angle relative to the line section.

16. The fixture according to claim 1, wherein the ultraviolet light radiating device comprises a water-tight encapsulated unit filled with an oxygen-free gas.

17. The fixture according to claim 16, wherein the gas is nitrogen.

* * * * *